United States Patent
Chen et al.

(10) Patent No.: US 11,232,392 B2
(45) Date of Patent: Jan. 25, 2022

(54) METHOD FOR PROCESSING ORDERS AND ELECTRONIC DEVICE

(71) Applicant: BEIJING XINGXUAN TECHNOLOGY CO., LTD., Beijing (CN)

(72) Inventors: Jinqing Chen, Beijing (CN); Shaojian Huang, Beijing (CN); Ke Xian, Beijing (CN); Qiuyuan Yang, Beijing (CN); Jiajia Rao, Beijing (CN); Xun Dong, Beijing (CN); Yangqing He, Beijing (CN); Mingquan Xu, Beijing (CN)

(73) Assignee: Beijing Xingxuan Technology Co., Ltd., Beijing (CN)

( * ) Notice: Subject to any disclaimer, the term of this patent is extended or adjusted under 35 U.S.C. 154(b) by 103 days.

(21) Appl. No.: 16/637,391

(22) PCT Filed: Dec. 26, 2017

(86) PCT No.: PCT/CN2017/118687
§ 371 (c)(1),
(2) Date: Feb. 7, 2020

(87) PCT Pub. No.: WO2019/029097
PCT Pub. Date: Feb. 14, 2019

(65) Prior Publication Data
US 2020/0175570 A1 Jun. 4, 2020

(30) Foreign Application Priority Data
Aug. 7, 2017 (CN) .......................... 201710666831.6

(51) Int. Cl.
*G06Q 10/08* (2012.01)
*G06Q 10/04* (2012.01)
*G06Q 30/06* (2012.01)

(52) U.S. Cl.
CPC ..... *G06Q 10/08355* (2013.01); *G06Q 10/047* (2013.01); *G06Q 10/083* (2013.01);
(Continued)

(58) Field of Classification Search
None
See application file for complete search history.

(56) References Cited

U.S. PATENT DOCUMENTS 8,386,283 B2 * 2/2013 Hand ................. G06Q 10/0631 705/7.11
9,651,950 B2 * 5/2017 Jang ....................... G05D 1/027
(Continued)

FOREIGN PATENT DOCUMENTS

AU 2015305511 3/2017
CN 104217313 12/2014
(Continued)

OTHER PUBLICATIONS

International Search Report on PCT/CN2017/118687. May 8, 2018. (Year: 2018).*
(Continued)

*Primary Examiner* — Nicholas D Rosen
(74) *Attorney, Agent, or Firm* — McCoy Russell LLP

(57) ABSTRACT

Method for processing orders and electronic device are disclosed. A embodiment of the method comprises: acquiring a new order group, wherein the new order group comprises at least one new order; determining a candidate delivery unit set according to a preset delivery area and an end task position of each delivery unit of at least one delivery unit and order information concerning new orders in the new order group, wherein the end task position of the delivery unit is a position after the delivery unit has already completed the delivery concerning all allocated orders; selecting one delivery unit from the candidate delivery unit
(Continued)

set as a target delivery unit on the basis of the order information concerning the new orders and the preset delivery area and the end task position of each candidate delivery uni; and allocating the new orders to the target delivery unit.

21 Claims, 5 Drawing Sheets

(52) U.S. Cl.
CPC ..... *G06Q 10/0834* (2013.01); *G06Q 30/0635* (2013.01); *G06Q 10/087* (2013.01)

(56) References Cited

U.S. PATENT DOCUMENTS

| | | | | |
|---|---|---|---|---|
| 10,255,577 | B1* | 4/2019 | Steves | G05D 1/0212 |
| 10,393,528 | B2* | 8/2019 | Schubert | G01C 21/005 |
| 2011/0231217 | A1* | 9/2011 | Hand | G06Q 10/047 |
| | | | | 705/7.12 |
| 2014/0025228 | A1* | 1/2014 | Jang | G05D 1/027 |
| | | | | 701/2 |
| 2015/0278759 | A1* | 10/2015 | Harris | H04W 4/024 |
| | | | | 705/338 |
| 2016/0055572 | A1 | 2/2016 | Chen | |
| 2019/0019145 | A1* | 1/2019 | Kim | G06Q 10/06315 |
| 2019/0041219 | A1* | 2/2019 | Schubert | G01C 21/3602 |

FOREIGN PATENT DOCUMENTS

| | | |
|---|---|---|
| CN | 105447736 | 3/2016 |
| CN | 105719110 | 6/2016 |
| CN | 105844349 | 8/2016 |
| CN | 106502999 | 3/2017 |
| CN | 106779183 | 5/2017 |
| CN | 106779910 | 5/2017 |
| SG | 11201700988 | 3/2017 |
| SG | 11201700988 W * | 3/2017 |
| WO | 0152163 | 7/2001 |
| WO | 2016028876 | 2/2016 |

OTHER PUBLICATIONS

Machine translation of CN-104217313, Xia and Yang, obtained from European Patent Office, Jul. 13, 2021. (Year: 2021).*
Written Opinion of the International Searching Authority on PCT/CN2017/118687, dated May 8, 2018. (Year: 2018).*
First Office Action on Chinese Patent Application 201710666831.6, dated Jun. 13, 2018. (Year: 2018).*
Second Office Action on Chinese Patent Application 201710666831.6, dated Aug. 15, 2018. (Year: 2018).*
Decision of Rejection on Chinese Patent Application 201710666831.6, dated Oct. 31, 2018. (Year: 2018).*
Third Office Action on Chinese Patent Application 201710666831.6, dated Apr. 4, 2018. (Year: 2019).*

* cited by examiner

200000000000# METHOD FOR PROCESSING ORDERS AND ELECTRONIC DEVICE

CROSS-REFERENCE TO RELATED APPLICATION

This is a national stage application under 35 U.S.C. § 371 (c) of prior-filed, co-pending, PCT application serial number PCT/CN2017/118687, filed on Dec. 26, 2017, which claims priority to Chinese patent application number 201710666831.6, filed Aug. 7, 2017, the entire contents of which are incorporated herein in their entireties.

TECHNICAL FIELD

The present disclosure relates to the field of computer technology, specifically to the field of Internet technology, and particularly to a method and device for processing orders.

BACKGROUND

With the development of computer technology, and particularly Internet technology, e-commerce has become an increasingly important form of business. E-commerce generally refers to business activities that use Internet technology as a means and take commodity exchange as a center. It can also be understood as activities that perform transaction activities and related services in the manner of electronic transactions on the Internet, intranet and value-added network (VAN), and is electronic, networked and informatized in all links of traditional business activities.

With the continuous development of e-commerce, the same-city item delivery has also become particularly important. In the prior art, the pickup address and the delivery address of the same-city item delivery are in one business circle, and the corresponding order will also be allocated to the delivery unit in this business circle. However, in the city-wide dispatch scenario, users have no business circle restrictions when consuming. As a result, the pickup address and delivery address of each delivery order may not be in one business circle, and the delivery distance is relatively long. The existing order processing methods are not suitable for city-wide dispatch, and it is necessary to solve the problem of how to reasonably allocate orders in the city-wide dispatch scenario to ensure delivery efficiency.

SUMMARY

The object of embodiments of the present disclosure is to propose an improved method and device for processing orders to solve the technical problem mentioned in the above background section.

An embodiment of the present disclosure discloses a method for processing orders, the method comprising: acquiring a new order group, wherein the new order group comprises at least one new order; determining a candidate delivery unit set according to a preset delivery area and an end task position of each delivery unit of at least one delivery unit and order information concerning new orders in the new order group, wherein the end task position of the delivery unit is a position after the delivery unit has already completed the delivery concerning all allocated orders; selecting one delivery unit from the candidate delivery unit set as a target delivery unit on the basis of the order information concerning the new orders in the new order group and the preset delivery area and the end task position of each candidate delivery unit in the candidate delivery unit set; allocating the new orders in the new order group to the target delivery unit.

An embodiment of the present disclosure discloses an electronic device comprising: at least one processor; and at least one memory; wherein one or more programs are stored in the at least one memory, and when executed by the at least one processor, the one or more programs cause the at least one processor to: acquire a new order group, wherein the new order group comprises at least one new order; determine a candidate delivery unit set according to a preset delivery area and an end task position of each delivery unit of at least one delivery unit and order information concerning new orders in the new order group, wherein the end task position of the delivery unit is a position after the delivery unit has already completed the delivery concerning all allocated orders; select one delivery unit from the candidate delivery unit set as a target delivery unit on the basis of the order information concerning the new orders in the new order group and the preset delivery area and the end task position of each candidate delivery unit in the candidate delivery unit set; and allocate the new orders in the new order group to the target delivery unit.

An embodiment of the present disclosure discloses a non-volatile computer-readable storage medium having stored thereon a computer program, wherein the computer program, when executed by a processor, implements the method as described above.

With the method and device for processing orders provided by the embodiments of the present disclosure, by acquiring a new order group, then determining a candidate delivery unit set according to a preset delivery area and an end task position of each delivery unit of at least one delivery unit and order information concerning new orders in the new order group, then selecting one delivery unit from the candidate delivery unit set as a target delivery unit on the basis of the order information concerning the new orders in the new order group and the preset delivery area and the end task position of each candidate delivery unit in the candidate delivery unit set, and finally allocating the new orders in the new order group to the target delivery unit, the preset delivery area information and the end task position of the delivery unit and the order information concerning the new orders in the new order group are efficiently utilized, thereby implementing the reasonable selection of a delivery unit and helping to improve delivery efficiency.

BRIEF DESCRIPTION OF THE DRAWINGS

The other features, objects and advantages of the present disclosure will become more apparent by reading the specific descriptions of non-limitative embodiments made with reference to the drawings below, in which.

DETAILED DESCRIPTION

Figure 1:
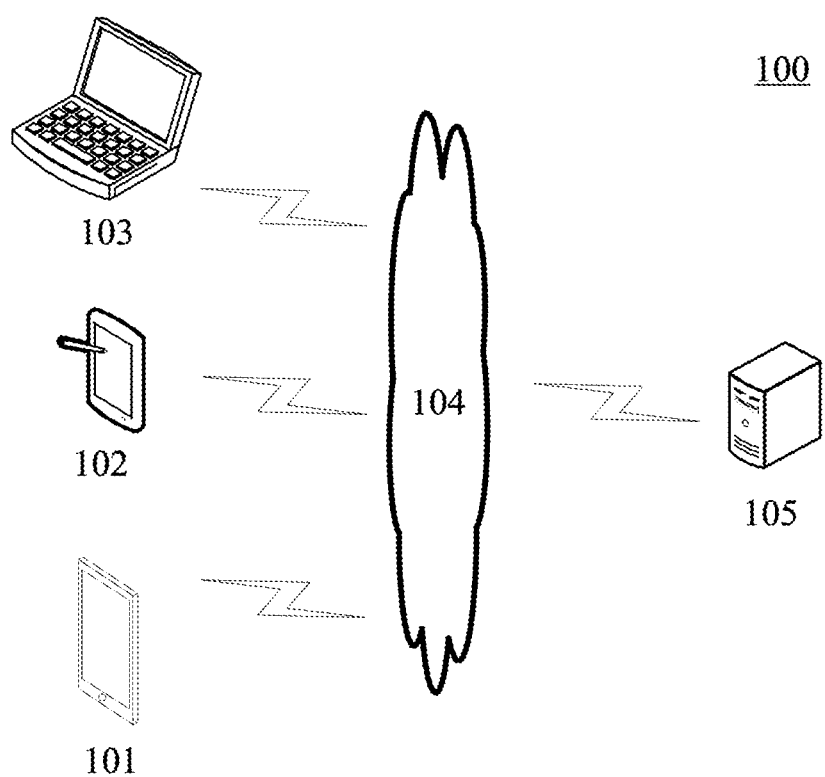
FIG. 1 is an exemplary system architecture diagram to which the present application can be applied.

The present disclosure will be further described in detail with reference to the drawings and embodiments below. It can be understood that the specific embodiments described herein are only used to explain the related invention, instead of limiting the invention. In addition, it should also be noted that, for the convenience of description, only the parts related to the related invention are shown in the drawings.

It should be noted that, in the case of no conflict, the embodiments in the present disclosure and the features in the embodiments can be combined with each other. The disclosure will be described in detail with reference to the drawings in combination with embodiments below.

FIG. 1 illustrates an exemplary system architecture 100 to which an embodiment of a method for processing orders or a device for processing orders of the present disclosure can be applied.

As shown in FIG. 1, the system architecture 100 may include terminal devices 101, 102, 103, a network 104, and a server 105. The network 104 is a medium for providing a communication link between the terminal devices 101, 102, 103 and the server 105. The network 104 may include various connection types, such as wired, wireless communication links or fiber optic cables and the like.

A user can use the terminal devices 101, 102, 103 to interact with the server 105 through the network 104 to receive or send messages and the like. Various client applications, such as logistics/takeaway applications, document management applications, web browser applications, shopping applications, search applications, instant messaging tools, email clients, social platform software and the like, can be installed on the terminal devices 101, 102, 103.

The terminal devices 101, 102, 103 may be various electronic devices with a display screen, including but not limited to smart phones, tablet computers, laptop computers, and desktop computers and the like.

The server 105 may be a server that provides various services, for example, a background order processing server that supports logistics/takeaway applications and the like on the terminal devices 101, 102, and 103. The above background order processing server may perform processing such as storage, analysis and the like on an order received from the terminal device, and feed back a processing result to the above terminal device and a logistics delivery unit that executes the order.

As shown in FIG. 1, by installing corresponding logistics/takeaway applications on the terminal devices 101, 102, 103, or by browsing corresponding logistics/takeaway websites on the terminal devices 101, 102, 103, these terminal devices can send an item delivery request to the server 105 in the form of an order, and thereafter, the above method for processing orders can be executed by the server. Accordingly, a device for processing orders may be provided in the server 105.

It should be understood that the numbers of terminal devices, networks, and servers in FIG. 1 are only illustrative. According to implementation needs, there can be any number of terminal devices, networks, and servers.

Figure 2:
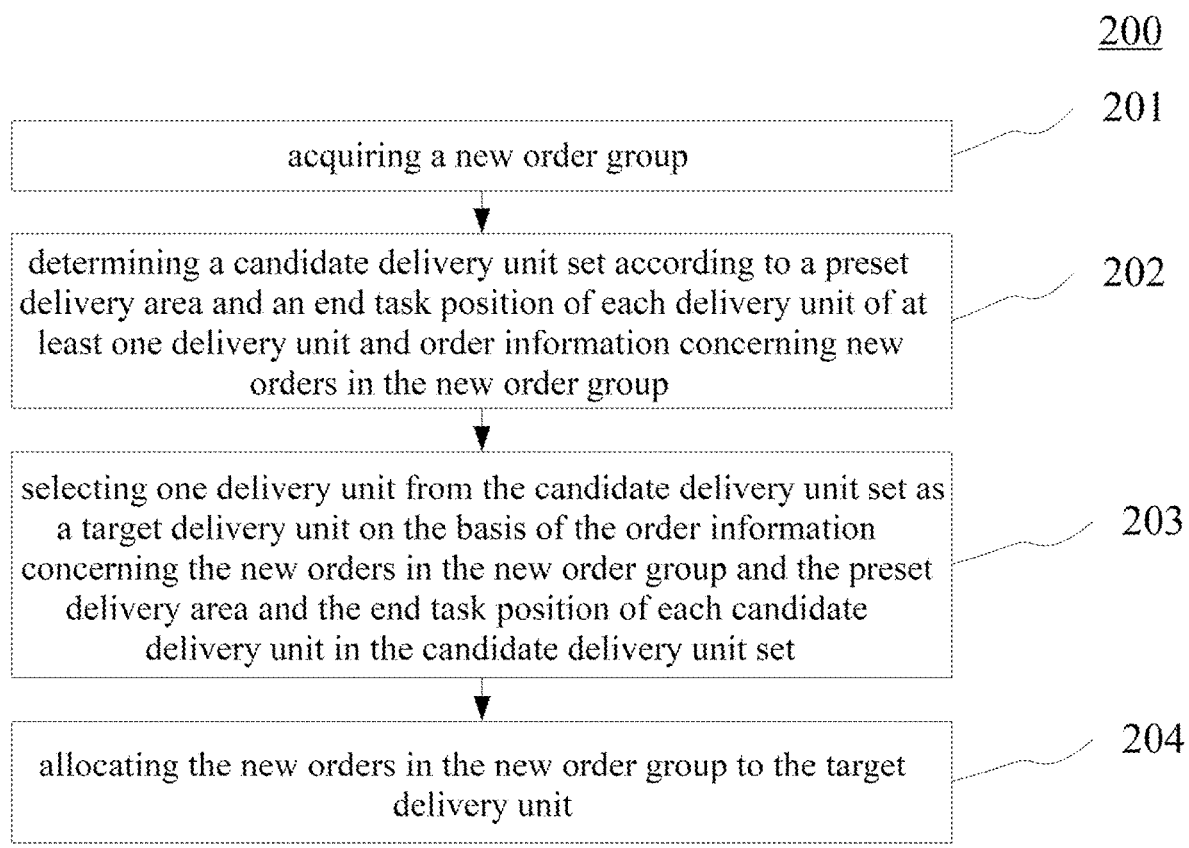
FIG. 2 is a flow chart of an embodiment of a method for processing orders according to the present disclosure.

Continuing with reference to FIG. 2, a flowchart 200 of an embodiment of a method for processing orders according to the present disclosure is shown. The method for processing orders comprises the following steps:

Step 201: Acquire a new order group.

In this embodiment, an electronic device (for example, the server shown in FIG. 1) on which the method for processing orders runs can acquire a new order group. Here, the new order group may comprise at least one new order. Here, the above electronic device may group the new orders received from the terminal device in various ways, and acquire a group of unallocated new orders as a new order group. As an example, the above electronic device may group at least one new order received within a preset time period (for example, 1 minute) according to a pickup position of an item involved in the new order, and the above electronic device may also group at least one new order received within a preset time period (for example, 1 minute) according to an expected delivery time of the new order, or the above electronic device may also group at least one new order received within a preset time period (for example, 1 minute) according to an earliest pickup time (i.e., a time when, an item to be delivered is ready by a merchant) of the new order.

Step 202: Determine a candidate delivery unit set, according to a preset delivery area and an end task position of each delivery unit of at least one delivery unit and order information concerning new orders in the new order group.

In this embodiment, on the basis of the new order group obtained in step 201, the above electronic device (for example, the server shown in FIG. 1) can determine, in at least one delivery unit, a candidate delivery unit set according to a preset delivery area and an end task position of each delivery unit of at least one delivery unit and order information concerning new orders in the new order group.

In this embodiment, the delivery unit may include various transportation means for item delivery operated by a delivery person, for example may include, but not limited to, a bicycle, a motorcycle, a car, a boat, and the like. Each delivery unit can execute one or more orders. Each delivery unit can be preset with a delivery area, that is, a delivery range of the delivery unit is preferably within the preset delivery area of the delivery unit, or a shortest distance between the delivery range of the delivery unit and an outer contour of the preset delivery area of the delivery unit preferably does not exceed a delivery excess distance preset with respect to the delivery unit. For example, different delivery excess distances may be set according to different types of transportation means of the delivery unit. For example, 3 kilometers of delivery excess distance is set for electric bicycles, and 6 kilometers of delivery excess distance is set for motorcycles.

In this embodiment, the end task position of the delivery unit may be a position where the delivery unit is located after completing execution of a delivery order allocated to the delivery unit, i.e., a position where the delivery unit is located after completing the delivery of all the items involved in the order allocated to the delivery unit.

In this embodiment, the order information of a new order may comprise at least one of the following: a pickup position, a delivery position, an earliest pickup time, and an expected delivery time In order to execute a new order, a delivery unit in the candidate delivery unit set needs to start to deliver various items involved in the new order from an end task position after completing the allocated order. In addition, each delivery unit needs to perform delivery within a preset delivery area of the delivery unit as far as possible. Accordingly, a candidate delivery unit set may be determined according to a preset delivery area and an end task position of each delivery unit of at least one delivery unit and order information concerning new orders in the new order group.

In some optional implementations of this embodiment, the above electronic device may determine, as the candidate delivery unit set, delivery units for which a first distance sum is smaller than a first preset distance threshold in the at least one delivery unit, wherein the first distance sum of the delivery unit is the sum of shortest distances between the end task position of the delivery unit and the pickup position of each new order in the new order group;

In some optional implementations of this embodiment, the above electronic device may also determine, as the candidate delivery unit set, delivery units for which a second distance sum is smaller than a second preset distance threshold in the at least one delivery unit, wherein the second distance sum of the delivery unit is the sum of shortest distances between the end task position of the delivery unit and the pickup position of each new order in the new order group; or In some optional implementations of this embodiment, the above electronic device may also determine, as the candidate delivery unit set, delivery units for which a third distance sum is smaller than a third preset distance threshold in the at least one delivery unit, wherein the third distance sum of the delivery unit is the sum of a pickup distance sum and a delivery distance sum of the delivery unit, wherein the pickup distance sum of the delivery unit is the sum of shortest distances between the end task position of the delivery unit and the pickup position of each new orders in the new order group, the delivery distance sum of the delivery unit is the sum of shortest distances between the end task position of the delivery unit and the delivery position of each new order in the new order group.

Step 203: Select one delivery unit from the candidate delivery unit set as a target delivery unit on the basis of the order information concerning the new orders in the new order group and the preset delivery area and the end task position of each candidate delivery unit in the candidate delivery unit set.

In this embodiment, the electronic device on which the method for processing orders runs may select one delivery unit from the candidate delivery unit set as a target delivery unit on the basis of the order information concerning the new orders in the new order group and the preset delivery area and the end task position of each candidate delivery unit in the candidate delivery unit set.

In some optional implementations of this embodiment, the above electronic device may select, as the target delivery unit, a delivery unit in the candidate delivery unit set for which a distance sum of the distances between an end task position and the pickup positions of each new orders in the new order group is the shortest.

In some optional implementations of this embodiment, the above electronic device may also select, as the target delivery unit, a delivery unit in the candidate delivery unit set for which a distance sum of the distances between an end task position and the delivery position of each new order in the new order group is the shortest.

In some optional implementations of this embodiment, the above electronic device may also select, as the target delivery unit, a delivery unit in the candidate delivery unit set for which a number-of-orders-in-region is the most, wherein the number-of-orders-in-region of the delivery unit is the number of new orders in the new order group for which pickup positions and/or the delivery positions are within the preset delivery area of the delivery unit.

Step 204: Allocate the new orders in the new order group to the target delivery unit.

In this embodiment, the above electronic device may, after determining the target delivery unit in step 203, adopt various methods to allocate the new orders in the new order group to the target delivery unit. As an example, a short message including the order information concerning the new orders in the new order group may be sent to a mobile phone number corresponding to the target delivery unit, and alternatively, a voice content including the order information concerning the new orders in the new order group may be sent to the target delivery unit by dialing the mobile phone number corresponding to the target delivery unit.

In some optional implementations of this embodiment, each delivery unit corresponds to a terminal. In this way, the above electronic device can send the order information of the new orders in the new order group to a terminal corresponding to the target delivery unit.

In some optional implementations of this embodiment, the above electronic device may also perform the operation of: in response to receiving a delivery area setting request including a delivery unit identifier and area information sent by a terminal, determining an area indicated by the area information to be a preset delivery area of a delivery unit indicated by the delivery unit identifier.

In some optional implementations of this embodiment, the above electronic device may also perform the following operations on the basis of the above optional implementations: first acquiring a preset delivery excess distance corresponding to a type of transportation means of the delivery unit indicated by the delivery unit identifier, and then determining, as a delivery range of the delivery unit indicated by the delivery unit identifier, an area with a shortest distance from an outer contour of the preset delivery area of the delivery unit indicated by the delivery unit identifier that is less than or equal to the determined preset delivery excess distance.

With the method provided by the embodiment of the present disclosure, by acquiring a new order group, then determining a candidate delivery unit set according to a preset delivery area and an end task position of each delivery unit of at least one delivery unit and order information concerning new orders in the new order group, then selecting one delivery unit from the candidate delivery unit set as a target delivery unit on the basis of the order information concerning the new orders in the new order group and the preset delivery area and the end task position of each candidate delivery unit in the candidate delivery unit set, and finally allocating the new orders in the new order group to the target delivery unit, the preset delivery area information and the end task position of the delivery unit and the order information concerning the new orders in the new order group are efficiently utilized, thereby implementing the reasonable selection of a delivery unit and helping to improve delivery efficiency.

Figure 3:
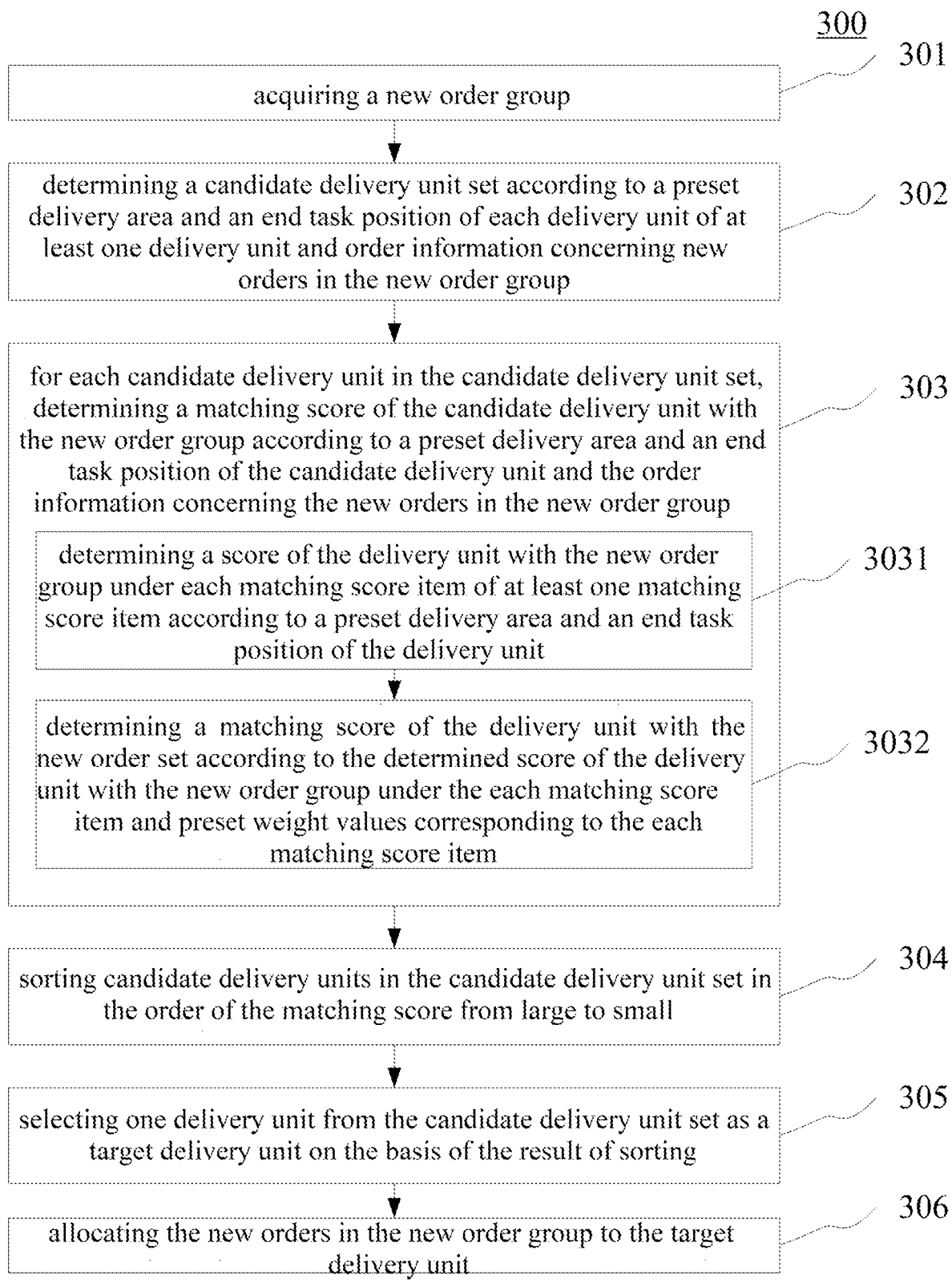
FIG. 3 is a flow chart of still another embodiment of a method for processing orders according to the present disclosure.

With further reference to FIG. 3, a process 300 of still another embodiment of a method for processing orders is shown. The process 300 of the method for processing orders comprises the following steps:

Step 301: Acquire a new order group.

Step 302: Determine a candidate delivery unit set according to a preset delivery area and an end task position of each delivery unit of at least one delivery unit and order information concerning new orders in the new order group.

In this embodiment, the specific operations of steps 301 and 302 are substantially the same as the operations of steps 201 and 202 in the embodiment shown in FIG. 2, and will not be repeatedly described herein.

Step 303: For each candidate delivery unit in the candidate delivery unit set, determine a matching score of the candidate delivery unit with the new order group according to a preset delivery area and an end task position of the candidate delivery unit and the order information concerning the new orders in the new order group.

In this embodiment, step 303 may comprise the following sub-steps 3031 and 3032:

Sub-step 3031: Determine a score of the delivery unit with the new order group under each of at least one matching score item according to a preset delivery area and an end task position of the delivery unit.

Here, the at least one matching score item may include, but is not limited to, at least one of the following: a first-order distance matching score item, a return distance difference matching score item, a last-order return distance matching score item, a return cost matching score item, and a number-of-orders-in-region matching score item.

In some optional implementation manners of this embodiment, the above electronic device may also perform the following operations before sub-step 3031:

First, an execution order of executing the new order group by the delivery unit after allocating the new order group to the delivery unit may be determined according to an end task position of the delivery unit and order information concerning each new order in the new order group. As an example, the execution order of executing the new order group by the delivery unit after allocating the new order group to the delivery unit may be determined according to the principle of the shortest path, that is, the delivery unit selects an order execution order corresponding to a path with shortest routes starting from the task end position to completion of pickup and delivery tasks in the new orders in the new order group. As an example, the execution order of executing the new order group by the delivery unit may also be determined according to an earliest pickup time of each new order in the new order group, that is, orders with preceding earliest pickup times in the new order group are picked up first, orders with subsequent earliest pickup times in the new order group are picked up subsequently, and the orders are delivered according to the pickup order after completion of the pickups of all the orders in the new order group. As an example, the execution order of executing the new order group by the delivery unit may also be determined according to an expected delivery time of each new order in the new order group, that is, orders with preceding expected delivery times in the new order group are picked up first, orders with subsequent expected delivery times in the new order group are picked up subsequently, and the orders are delivered according to the pickup order after completion of the pickups of all the orders in the new order group.

Then, a first pickup position and a last delivery position for executing the new order group by the delivery unit may be determined according to the determined execution order. That is, the first pickup position determined herein is a pickup position of a new order whose execution order is the first in the new order group, and the last delivery position determined herein is a delivery position of a new order whose execution order is the last in the new order group.

Through the above operations, the above electronic device can more accurately determine a score of the delivery unit with the new order group under each of at least one matching score item according to a preset delivery area and an end task position of the delivery unit In some optional implementations of this embodiment, the above electronic device may determine a score of the delivery unit with the new order group under a first-order distance matching score item according to a preset delivery area and an end task position of the delivery unit, wherein the score of the delivery unit with the new order group under the first-order distance matching score item is negatively related to a first pickup distance of the delivery unit, the first pickup distance of the delivery unit is a distance between the end task position of the delivery unit and the determined first pickup position of the delivery unit.

In some optional implementations of this embodiment, the above electronic device may determine a score of the delivery unit with the new order group under a return distance difference matching score item according to a preset delivery area and an end task position of the delivery unit, wherein the score of the delivery unit with the new order group under the return distance difference matching score item is positively related to a return distance difference of the delivery unit. The return distance difference of the delivery unit is a difference of a first-order return distance of the delivery unit minus a last-order return distance of the delivery unit, the first-order return distance of the delivery unit is a shortest distance between the end task position of the delivery unit and the preset delivery area of the delivery unit, and the last-order return distance of the delivery unit is a shortest distance between the determined last delivery position and the preset delivery area of the delivery unit.

In some optional implementations of this embodiment, the above electronic device may determine a score of the delivery unit with the new order group under a last-order return distance matching score item according to a preset delivery area and an end task position of the delivery unit, wherein the score of the delivery unit with the new order group under the last-order return distance matching score item is negatively related to the last-order return distance of the delivery unit.

In some optional implementations of this embodiment, the above electronic device may determine a score of the delivery unit with the new order group under a return cost matching score item according to a preset delivery area and an end task position of the delivery unit, wherein the score of the delivery unit with the new order group under the return cost matching score item is negatively related to a first ratio of the delivery unit. The first ratio of the delivery unit is a ratio of a first distance sum of the delivery unit to the first-order return distance of the delivery unit, the first distance sum of the delivery unit is the sum of the first pickup distance, the last-order return distance and the first-and-last-order distance of the delivery unit, and the first-and-last-order distance of the delivery unit is a distance between the determined first pickup position and a last delivery position.

In some optional implementations of this embodiment, the above electronic device may determine a score of the delivery unit with the new order group under a number-of-orders-in-region matching score item according to a preset delivery area and an end task position of the delivery unit, wherein the score of the delivery unit with the new order group under a number-of-orders-in-region matching score item is positively related to the number-of-orders-in-region of the delivery unit, the number-of-orders-in-region of the delivery unit is the number of new orders in the new order group for which pickup positions and/or the delivery positions are within the preset delivery area of the delivery unit.

Sub-step 3032: Determine a matching score of the delivery unit with the new order set according to the determined score of the delivery unit with the new order group under each of at least one matching score item and a preset weight value corresponding to the matching score item.

Here, a corresponding weight value can be preset for each matching score item in at least one matching score item. In this way, a matching score of the delivery unit with the new order set can be determined according to the determined score of the delivery unit with the new order group under each of at least one matching score item and a preset weight value corresponding to the matching score item, after the score of the delivery unit with the new order group under each of at least one matching score item has been determined in sub-step 3031.

Step 304: Sort candidate delivery units in the candidate delivery unit set in the order of the matching score from large to small.

In this embodiment, the above electronic device may sort candidate delivery units in the candidate delivery unit set in the order of the matching score with the new order group from large to small as determined in step 303.

Step 305: Select one delivery unit from the candidate delivery unit set as the target delivery unit on the basis of a result of the sorting.

In this embodiment, a delivery unit with a preceding sorting order may be selected as the target delivery unit on the basis on the result of the sorting of the plurality of delivery units in the above step 304.

Step 306: Allocate the new orders in the new order group to the target delivery unit.

In this embodiment, the specific operation of step 306 is substantially the same as the operation of step 204 in the embodiment shown in FIG. 2, and will not be repeatedly described. It can be seen from FIG. 3 that, compared with the embodiment corresponding to FIG. 2, the process 300 of the method for processing orders in this embodiment is incorporated with the step of determining, for each candidate delivery unit in the candidate delivery unit set, a matching score of the candidate delivery unit with the new order group, and the steps of performing sorting according to the matching score, and of determining a target delivery unit according to a result of the sorting. Accordingly, the solution described in this embodiment can comprehensively consider the delivery unit and the order information concerning the new orders in the new order group, thereby achieving an improvement in delivery efficiency to a larger extent.

Figure 4:
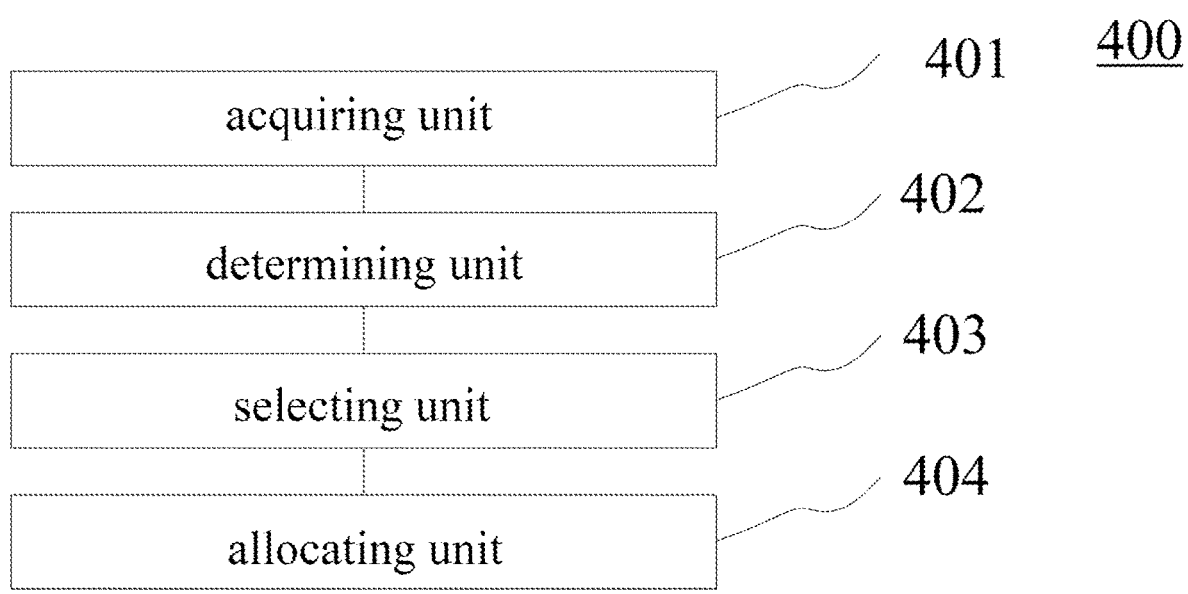
FIG. 4 is a schematic structural diagram of an embodiment of a device for processing orders according to the present disclosure.

With further reference to FIG. 4, as an implementation of the method shown in the above figures, the present disclosure provides an embodiment of a device for processing orders. The device embodiment corresponds to the method embodiment shown in FIG. 2. The device can be specifically applied to various electronic devices.

As shown in FIG. 4, the device 400 for processing orders in this embodiment comprises: an acquiring unit 401, a determining unit 402, a selecting unit 403, and an allocating unit 404, wherein the acquiring unit 401 is configured to acquire a new order group, wherein the above new order group comprises at least one new order; the determining unit 402 is configured to determine a candidate delivery unit set according to a preset delivery area and an end task position of each delivery unit of at least one delivery unit and order information concerning new orders in the new order group, wherein the end task position of the delivery unit is a position after the delivery unit has already completed the delivery concerning all allocated orders; the selecting unit 403 is configured to select one delivery unit from the candidate delivery unit set as a target delivery unit on the basis of the order information concerning the new orders in the new order group and the preset delivery area and the end task position of each candidate delivery unit in the candidate delivery unit set; the allocating unit 404 is configured to allocate the new orders in the new order group to the target delivery unit In this embodiment, the specific processing of the acquiring unit 401, the determining unit 402, the selecting unit 403 and the allocating unit 404 of the device 400 for processing orders and the technical effects brought by them can make reference to the related descriptions of step 201, step 202, step 203, and step 204 in the embodiment corresponding to FIG. 2 respectively, and will not be repeated described herein.

In some optional implementations of this embodiment, the order information may comprise at least one of the following: a pickup position, a delivery position, an earliest pickup time, and an expected delivery time; and the above selecting unit 403 may comprise: a sorting module (not shown) configured to sort candidate delivery units in the candidate delivery unit set on the basis of the order information concerning the new orders in the new order group and the preset delivery area and the end task position of each candidate delivery unit in the candidate delivery unit set; a selecting module (not shown) configured to select one delivery unit from the candidate delivery unit set as the target delivery unit on the basis of a result of the sorting.

In some optional implementations of this embodiment, the above sorting module may comprise: a matching score determining sub-module (not shown) configured to, for each candidate delivery unit in the candidate delivery unit set, determine a matching score of the candidate delivery unit with the new order group according to a preset delivery area and an end task position of the candidate delivery unit and the order information concerning the new orders in the new order group; a sorting sub-module (not shown) configured to sort candidate delivery units in the candidate delivery unit set in the order of the matching score with the new order group from large to small.

In some optional implementations of this embodiment, the above matching score determining sub-module may be further configured for: determining a score of the delivery unit with the new order group under each matching score item of at least one matching score item according to a preset delivery area and an end task position of the delivery unit; determining a matching score of the delivery unit with the new order set according to the determined score of the delivery unit with the new order group under the each matching score item and preset weight values corresponding to the each matching score item.

In some optional implementations of this embodiment, the above at least one matching score item may comprise at least one of the following: a first-order distance matching score item, a return distance difference matching score item, a last-order return distance matching score item, a return cost matching score item, and a number-of-orders-in-region matching score item.

In some optional implementations of this embodiment, the above sorting module may further comprise: an execution order determining sub-module (not shown) configured to determine, according to an end task position of the delivery unit and order information concerning each new order in the new order group, an execution order of executing the new order group by the delivery unit after allocating the new order group to the delivery unit; a position determining sub-module (not shown) configured to determine, according to the determined execution order, a first pickup position and a last delivery position for executing the new order group by the delivery unit.

In some optional implementations of this embodiment, the above matching score determining sub-module may be further configured for: determining a score of the delivery unit with the new order group under a first-order distance matching score item according to a preset delivery area and an end task position of the delivery unit, wherein the score of the delivery unit with the new order group under the first-order distance matching score item is negatively related to a first pickup distance of the delivery unit, the first pickup distance of the delivery unit is a distance between the end task position of the delivery unit and the determined first pickup position.

In some optional implementations of this embodiment, the above matching score determining sub-module may be further configured for: determining a score of the delivery unit with the new order group under a return distance difference matching score item according to a preset delivery area and an end task position of the delivery unit, wherein the score of the delivery unit with the new order group under the return distance difference matching score item is positively related to a return distance difference of the delivery unit, the return distance difference of the delivery unit is a difference of a first-order return distance of the delivery unit minus a last-order return distance of the delivery unit, the first-order return distance of the delivery unit is a shortest distance between the end task position of the delivery unit and the preset delivery area of the delivery unit, the last-order return distance of the delivery unit is a shortest distance between the determined last delivery position and the preset delivery area of the delivery unit.

In some optional implementations of this embodiment, the above matching score determining sub-module may be further configured for: determining a score of the delivery unit with the new order group under a last-order return distance matching score item according to a preset delivery area and an end task position of the delivery unit, wherein the score of the delivery unit with the new order group under the last-order return distance matching score item is negatively related to the last-order return distance of the delivery unit.

In some optional implementations of this embodiment, the above matching score determining sub-module may be further configured for: determining a score of the delivery unit with the new order group under a return cost matching score item according to a preset delivery area and an end task position of the delivery unit, wherein the score of the delivery unit with the new order group under the return cost matching score item is negatively related to a first ratio of the delivery unit, the first ratio of the delivery unit is a ratio of a first distance sum of the delivery unit to the first-order return distance of the delivery unit, the first distance sum of the delivery unit is the sum of the first pickup distance, the last-order return distance and the first-and-last-order distance of the delivery unit, the first-and-last-order distance of the delivery unit is a distance between the determined first pickup position and a last delivery position.

In some optional implementations of this embodiment, the above matching score determining sub-module may be further configured for: determining a score of the delivery unit with the new order group under a number-of-orders-in-region matching score item according to a preset delivery area and an end task position of the delivery unit, wherein the score of the delivery unit with the new order group under the number-of-orders-in-region matching score item is positively related to the number-of-orders-in-region of the delivery unit, the number-of-orders-in-region of the delivery unit is the number of new orders in the new order group for which pickup positions and/or the delivery positions are within the preset delivery area of the delivery unit.

In some optional implementations of this embodiment, the above determining unit 402 may be further configured for: determining, as the candidate delivery unit set, delivery units for which a first distance sum is smaller than a first preset distance threshold in the at least one delivery unit, wherein the first distance sum of the delivery unit is the sum of shortest distances between the end task position of the delivery unit and the pickup position of each new order new orders in the new order group; or determining, as the candidate delivery unit set, delivery units for which a second distance sum is smaller than a second preset distance threshold in the at least one delivery unit, wherein the second distance sum of the delivery unit is the sum of shortest distances between the end task position of the delivery unit and the delivery position of each new orders in the new order group; or determining, as the candidate delivery unit set, delivery units for which a third distance sum is smaller than a third preset distance threshold in the at least one delivery unit, wherein the third distance sum of the delivery unit is the sum of a pickup distance sum and a delivery distance sum of the delivery unit, wherein the pickup distance sum of the delivery unit is the sum of shortest distances between the end task position of the delivery unit and the pickup position of each new orders in the new order group, the delivery distance sum of the delivery unit is the sum of shortest distances between the end task position of the delivery unit and the delivery position of each new orders in the new order group.

In some optional implementations of this embodiment, the above device 400 may further comprise: a delivery area determining unit (not shown) configured to, in response to receiving a delivery area setting request including a delivery unit identifier and area information sent by a terminal, determine an area indicated by the area information to be a preset delivery area of a delivery unit indicated by the delivery unit identifier.

In some optional implementations of this embodiment, the delivery unit may further comprise a type of transportation means and a delivery range; and the above device 400 may further comprise: a second acquiring unit (not shown) configured to acquire a preset delivery excess distance corresponding to a type of transportation means of the delivery unit indicated by the delivery unit identifier; a delivery range determining unit (not shown) configured to determine, as a delivery range of the delivery unit indicated by the delivery unit identifier, an aera with a shortest distance from an outer contour of the preset delivery area of the delivery unit indicated by the delivery unit identifier that is less than or equal to the determined preset delivery excess distance.

It should be noted that implementation details and technical effects of the units in the device for processing orders provided by the embodiment of the present disclosure, for which reference may be made to the descriptions of other embodiments in the present disclosure, will not be repeatedly described herein.

Figure 5:
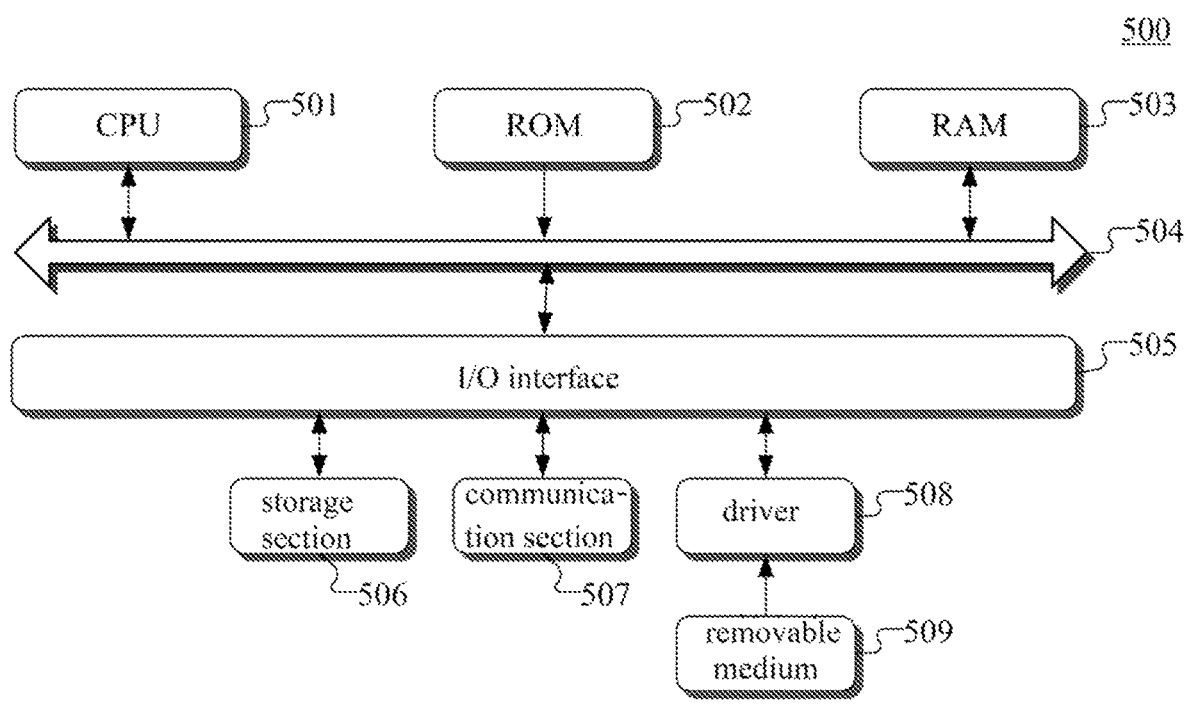
FIG. 5 is a schematic structural diagram of a computer system suitable for implementing an electronic device according to an embodiment of the present disclosure.

Reference is now made to FIG. 5, which shows a schematic structural diagram of a computer system 500 suitable for implementing an electronic device according to an embodiment of the present disclosure. The electronic device shown in FIG. 5 is only an example, and should not impose any limitation to the functions and the scope of use of the embodiments of the present disclosure.

As shown in FIG. 5, the computer system 500 includes a central processing unit (CPU) 501, which can be loaded into a random access memory (RAM) according to a program stored in a read-only memory (ROM) 502 or from a storage section 506. In the RAM 503, various programs and data needed for the operation of the system 500 are also stored. The CPU 501, the ROM 502, and the RAM 503 are connected to each other through a bus 504. An input/output (I/O) interface 505 is also connected to the bus 504.

The following components are connected to the I/O interface 505: a storage section 506 including a hard disk and the like; and a communication section 507 including a network interface card such as a LAN (Local Area Network) card, a modem and the like. The communication section 507 performs communication processing via a network such as the Internet. The driver 508 is also connected to the I/O interface 505 as needed. A removable medium 509, such as a magnetic disk, an optical disk, a magneto-optical disk, a semiconductor memory and the like, is installed on the drive 508 as needed, so that a computer program read therefrom is installed into the storage section 506 as needed.

Particularly, according to an embodiment of the present disclosure, the process described above with reference to the flowchart may be implemented as a computer software program. For example, embodiments of the present disclosure include a computer program product including a computer program carried on a computer-readable medium, the computer program containing program code for performing a method shown in a flowchart. In such an embodiment, the computer program may be downloaded and installed from a network through the communication section 507, and/or installed from a removable medium 509. When the computer program is executed by the central processing unit (CPU) 501, the above-mentioned functions defined in the method of the present disclosure are performed. It should be noted that the computer-readable medium described in the present disclosure may be a computer-readable signal medium or a computer-readable storage medium or any combination of the above-mentioned two. The computer-readable storage medium may be, for example, but not limited to, an electronic, magnetic, optical, electromagnetic, infrared, or semiconductor system, apparatus, or device, or any combination thereof. More specific examples of computer-readable storage media may include, but are not limited to: electrical connections with one or more wires, portable computer disks, hard disks, random access memory (RAM), read-only memory (ROM), erasable programming read-only memory (EPROM or flash memory), optical fiber, portable compact disk read-only memory (CD-ROM), optical storage device, magnetic storage device, or any suitable combination of the foregoing. In the present disclosure, a computer-readable storage medium may be any tangible medium that contains or stores a program that can be used by or in combination with an instruction execution system, apparatus, or device. In the present disclosure, a computer-readable signal medium may include a data signal that is carried in a baseband or propagated as part of a carrier wave, and which carries computer-readable program code. Such a propagated data signal may take various forms, including but not limited to electromagnetic signals, optical signals, or any suitable combination of the foregoing. The computer-readable signal medium may also be any computer-readable medium other than a computer-readable storage medium, and the computer-readable medium may send, propagate, or transmit a program for use by or in combination with an instruction execution system, apparatus, or device. Program code embodied on a computer-readable medium may be transmitted using any appropriate medium, including but not limited to wireless, wireline, optical fiber cable, RF, etc., or any suitable combination of the foregoing.

The flowchart and block diagrams in the drawings illustrate the architecture, functionality, and operation of possible implementations of systems, methods and computer program products according to various embodiments of the present disclosure. In this regard, each block in the flowchart or block diagram may represent a module, a program segment, or a part of code, which contains one or more executable instructions for implementing a specified logical function. It should also be noted that in some alternative implementations, the functions marked in the blocks may also occur in a different order than those marked in the drawings. For example, two successively represented boxes may actually be executed substantially in parallel, and sometimes they may also be executed in a reverse order, depending on the functions involved. It should also be noted that each block in the block diagrams and/or flowcharts, and combinations of blocks in the block diagrams and/or flowcharts, can be implemented by a dedicated hardware-based system that performs the specified function or operation, or can be implemented by a combination of dedicated hardware and computer instructions.

The units described in the embodiments of the present disclosure may be implemented by either software or hardware. The described unit may also be provided in a processor, for example, it may be described as: a processor comprising a first acquiring unit, a determining unit, a selecting unit, and an allocating unit. Wherein, the names of these units do not constitute a limitation to the units themselves in some cases. For example, the acquiring unit may also be described as a "unit for acquiring a new order group".

As another aspect, the present disclosure further provides a computer-readable medium, which may be contained in the device described in the above embodiments, and which may also exist alone without being assembled into the device. The above computer-readable medium carries one or more programs that, when executed by the device, causes the device to: acquire a new order group, wherein the new order group comprises at least one new order; determine a candidate delivery unit set according to a preset delivery area and an end task position of each delivery unit of at least one delivery unit and order information concerning new orders in the new order group, wherein the end task position of the delivery unit is a position after the delivery unit has already completed the delivery concerning all allocated orders; select one delivery unit from the candidate delivery unit set as a target delivery unit on the basis of the order information concerning the new orders in the new order group and the preset delivery area and the end task position of each candidate delivery unit in the candidate delivery unit set; allocate the new orders in the new order group to the target delivery unit.

The above descriptions are only preferred embodiments of the present disclosure and explanations of the applied technical principles. As should be understood by those skilled in the art, the scope of the invention involved in the present disclosure is not limited to the technical solution formed by the specific combination of the above technical features, and meanwhile should also cover other technical solutions formed by any combination of the above technical features or equivalent features thereof without departing from the above inventive concept, for example, technical solutions formed by mutual substitutions of the above features and technical features with similar functions disclosed in (but not limited to) the present disclosure.

What is claimed is:

1. A method for processing orders, wherein the method comprises:
   acquiring a new order group, wherein the new order group comprises at least one new order;
   determining a candidate delivery unit set according to a preset delivery area and an end task position of each delivery unit of at least one delivery unit and order information concerning new orders in the new order group, wherein the end task position of the delivery unit is a position after the delivery unit has already completed the delivery concerning all allocated orders;

selecting one delivery unit from the candidate delivery unit set as a target delivery unit on the basis of the order information concerning the new orders in the new order group and the preset delivery area and the end task position of each candidate delivery unit in the candidate delivery unit set; and allocating the new orders in the new order group to the target delivery unit.

2. The method according to claim 1, wherein the order information comprises at least one of the following: a pickup position, a delivery position, an earliest pickup time, and an expected delivery time; and the selecting one delivery unit from the candidate delivery unit set as a target delivery unit on the basis of the order information concerning the new orders in the new order group and the preset delivery area and the end task position of each candidate delivery unit in the candidate delivery unit set comprises:

sorting candidate delivery units in the candidate delivery unit set on the basis of the order information concerning the new orders in the new order group and the preset delivery area and the end task position of each candidate delivery unit in the candidate delivery unit set; and selecting one delivery unit from the candidate delivery unit set as the target delivery unit on the basis of a result of the sorting.

3. The method according to claim 2, wherein the sorting candidate delivery units in the candidate delivery unit set on the basis of the order information concerning the new orders in the new order group and the preset delivery area and the end task position of each candidate delivery unit in the candidate delivery unit set comprises:

for each candidate delivery unit in the candidate delivery unit set, determining a matching score of the candidate delivery unit with the new order group according to a preset delivery area and an end task position of the candidate delivery unit and the order information concerning the new orders in the new order group; and sorting candidate delivery units in the candidate delivery unit set in the order of the matching score with the new order group from large to small.

4. The method according to claim 3, wherein the determining a matching score of the candidate delivery unit with the new order group according to a preset delivery area and an end task position of the candidate delivery unit and the order information concerning the new orders in the new order group comprises:

determining a score of the delivery unit with the new order group under each matching score item of at least one matching score item according to a preset delivery area and an end task position of the delivery unit; and determining a matching score of the delivery unit with the new order set according to the determined score of the delivery unit with the new order group under the each matching score item and preset weight values corresponding to the each matching score item.

5. The method according to claim 4, wherein the at least one matching score item comprises at least one of the following: a first-order distance matching score item, a return distance difference matching score item, a last-order return distance matching score item, a return cost matching score item, and a number-of-orders-in-region matching score item.

6. The method according to claim 5, wherein before the determining a score of the delivery unit with the new order group under each matching score item of at least one matching score item according to a preset delivery area and an end task position of the delivery unit, the method further comprises:

determining, according to an end task position of the delivery unit and order information concerning each new order in the new order group, an execution order of executing the new order group by the delivery unit after allocating the new order group to the delivery unit; and determining, according to the determined execution order, a first pickup position and a last delivery position for executing the new order group by the delivery unit.

7. The method according to claim 6, wherein the determining a score of the delivery unit with the new order group under each matching score item of at least one matching score item according to a preset delivery area and an end task position of the delivery unit comprises at least one step in the following:

determining a score of the delivery unit with the new order group under a first-order distance matching score item according to the preset delivery area and the end task position of the delivery unit, wherein the score of the delivery unit with the new order group under the first-order distance matching score item is negatively related to a first pickup distance of the delivery unit, the first pickup distance of the delivery unit is a distance between the end task position of the delivery unit and the determined first pickup position;

determining a score of the delivery unit with the new order group under a return distance difference matching score item according to the preset delivery area and the end task position of the delivery unit, wherein the score of the delivery unit with the new order group under the return distance difference matching score item is positively related to a return distance difference of the delivery unit, the return distance difference of the delivery unit is a difference of a first-order return distance of the delivery unit minus a last-order return distance of the delivery unit, the first-order return distance of the delivery unit is a shortest distance between the end task position of the delivery unit and the preset delivery area of the delivery unit, the last-order return distance of the delivery unit is a shortest distance between the determined last delivery position and the preset delivery area of the delivery unit;

determining a score of the delivery unit with the new order group under a last-order return distance matching score item according to the preset delivery area and the end task position of the delivery unit, wherein the score of the delivery unit with the new order group under the last-order return distance matching score item is negatively related to the last-order return distance of the delivery unit;

determining a score of the delivery unit with the new order group under a return cost matching score item according to the preset delivery area and the end task position of the delivery unit, wherein the score of the delivery unit with the new order group under the return cost matching score item is negatively related to a first ratio of the delivery unit, the first ratio of the delivery unit is a ratio of a first distance sum of the delivery unit to the first-order return distance of the delivery unit, the first distance sum of the delivery unit is the sum of the first pickup distance, the last-order return distance and the first-and-last-order distance of the delivery unit, the first-and-last-order distance of the delivery unit is a distance between the determined first pickup position and a last delivery position; and determining a score of the delivery unit with the new order group under a number-of-orders-in-region matching score item according to a preset delivery area and an end task position of the delivery unit, wherein the score of the delivery unit with the new order group under a number-of-orders-in-region matching score item is positively related to the number-of-orders-in-region of the delivery unit, the number-of-orders-in-region of the delivery unit is the number of new orders in the new order group for which pickup positions and/or the delivery positions are within the preset delivery area of the delivery unit.

8. The method according to claim 2, wherein the determining a candidate delivery unit set according to a preset delivery area and an end task position of each delivery unit of at least one delivery unit and order information concerning new orders in the new order group comprises:

determining, as the candidate delivery unit set, delivery units for which a first distance sum is smaller than a first preset distance threshold in the at least one delivery unit, wherein the first distance sum of the delivery unit is the sum of shortest distances between the end task position of the delivery unit and the pickup position of each new order in the new order group; or determining, as the candidate delivery unit set, delivery units for which a second distance sum is smaller than a second preset distance threshold in the at least one delivery unit, wherein the second distance sum of the delivery unit is the sum of shortest distances between the end task position of the delivery unit and the delivery position of each new order in the new order group; or determining, as the candidate delivery unit set, delivery units for which a third distance sum is smaller than a third preset distance threshold in the at least one delivery unit, wherein the third distance sum of the delivery unit is the sum of a pickup distance sum and a delivery distance sum of the delivery unit, wherein the pickup distance sum of the delivery unit is the sum of shortest distances between the end task position of the delivery unit and the pickup position of each new order in the new order group, the delivery distance sum of the delivery unit is the sum of shortest distances between the end task position of the delivery unit and the delivery position of each new order in the new order group.

9. The method according to claim 8, wherein the method further comprises:

in response to receiving a delivery area setting request including a delivery unit identifier and area information sent by a terminal, determining an area indicated by the area information to be a preset delivery area of a delivery unit indicated by the delivery unit identifier.

10. The method according to claim 9, wherein the delivery unit further comprises a type of transportation means and a delivery range; and the method further comprises:

acquiring a preset delivery excess distance corresponding to a type of transportation means of the delivery unit indicated by the delivery unit identifier; and determining, as a delivery range of the delivery unit indicated by the delivery unit identifier, an area with a shortest distance from an outer contour of the preset delivery area of the delivery unit indicated by the delivery unit identifier that is less than or equal to the determined preset delivery excess distance.

11. An electronic device comprising:

at least one processor; and at least one memory;

wherein one or more programs are stored in the at least one memory, and when executed by the at least one processor, the one or more programs cause the at least one processor to:

acquire a new order group, wherein the new order group comprises at least one new order;

determine a candidate delivery unit set according to a preset delivery area and an end task position of each delivery unit of at least one delivery unit and order information concerning new orders in the new order group, wherein the end task position of the delivery unit is a position after the delivery unit has already completed the delivery concerning all allocated orders;

select one delivery unit from the candidate delivery unit set as a target delivery unit on the basis of the order information concerning the new orders in the new order group and the preset delivery area and the end task position of each candidate delivery unit in the candidate delivery unit set; and allocate the new orders in the new order group to the target delivery unit.

12. The electronic device according to claim 11, wherein the order information comprises at least one of the following: a pickup position, a delivery position, an earliest pickup time, and an expected delivery time; and the at least one processor is further caused to:

sort candidate delivery units in the candidate delivery unit set on the basis of the order information concerning the new orders in the new order group and the preset delivery area and the end task position of each candidate delivery unit in the candidate delivery unit set; and select one delivery unit from the candidate delivery unit set as the target delivery unit on the basis of a result of the sorting.

13. The electronic device according to claim 12, wherein the at least one processor is further caused to:

for each candidate delivery unit in the candidate delivery unit set, determine a matching score of the candidate delivery unit with the new order group according to a preset delivery area and an end task position of the candidate delivery unit and the order information concerning the new orders in the new order group; and sort candidate delivery units in the candidate delivery unit set in the order of the matching score with the new order group from large to small.

14. The electronic device according to claim 13, wherein the at least one processor is further caused to:

determine a score of the delivery unit with the new order group under each matching score item of at least one matching score item according to a preset delivery area and an end task position of the delivery unit; and determine a matching score of the delivery unit with the new order set according to the determined score of the delivery unit with the new order group under the each matching score item and preset weight values corresponding to the each matching score item.

15. The electronic device according to claim 14, wherein the at least one matching score item comprises at least one of the following: a first-order distance matching score item, a return distance difference matching score item, a last-order return distance matching score item, a return cost matching score item, and a number-of-orders-in-region matching score item.

16. The electronic device according to claim 15, wherein the at least one processor is further caused to:
   determine, according to an end task position of the delivery unit and order information concerning each new order in the new order group, an execution order of executing the new order group by the delivery unit after allocating the new order group to the delivery unit; and
   determine, according to the determined execution order, a first pickup position and a last delivery position for executing the new order group by the delivery unit.

17. The electronic device according to claim 16, wherein the at least one processor is further caused to perform at least one process in the following:
   determining a score of the delivery unit with the new order group under a first-order distance matching score item according to the preset delivery area and the end task position of the delivery unit, wherein the score of the delivery unit with the new order group under the first-order distance matching score item is negatively related to a first pickup distance of the delivery unit, the first pickup distance of the delivery unit is a distance between the end task position of the delivery unit and the determined first pickup position;
   determining a score of the delivery unit with the new order group under a return distance difference matching score item according to the preset delivery area and the end task position of the delivery unit, wherein the score of the delivery unit with the new order group under the return distance difference matching score item is positively related to a return distance difference of the delivery unit, the return distance difference of the delivery unit is a difference of a first-order return distance of the delivery unit minus a last-order return distance of the delivery unit, the first-order return distance of the delivery unit is a shortest distance between the end task position of the delivery unit and the preset delivery area of the delivery unit, the last-order return distance of the delivery unit is a shortest distance between the determined last delivery position and the preset delivery area of the delivery unit;
   determining a score of the delivery unit with the new order group under a last-order return distance matching score item according to the preset delivery area and the end task position of the delivery unit, wherein the score of the delivery unit with the new order group under the last-order return distance matching score item is negatively related to the last-order return distance of the delivery unit;
   determining a score of the delivery unit with the new order group under a return cost matching score item according to the preset delivery area and the end task position of the delivery unit, wherein the score of the delivery unit with the new order group under the return cost matching score item is negatively related to a first ratio of the delivery unit, the first ratio of the delivery unit is a ratio of a first distance sum of the delivery unit to the first-order return distance of the delivery unit, the first distance sum of the delivery unit is the sum of the first pickup distance, the last-order return distance and the first-and-last-order distance of the delivery unit, the first-and-last-order distance of the delivery unit is a distance between the determined first pickup position and a last delivery position; and
   determining a score of the delivery unit with the new order group under a number-of-orders-in-region matching score item according to a preset delivery area and an end task position of the delivery unit, wherein the score of the delivery unit with the new order group under the number-of-orders-in-region matching score item is positively related to the number-of-orders-in-region of the delivery unit, the number-of-orders-in-region of the delivery unit is the number of new orders in the new order group for which pickup positions and/or the delivery positions are within the preset delivery area of the delivery unit.

18. The electronic device according to claim 12, wherein the at least one processor is further caused to:
   determine as the candidate delivery unit set, delivery units for which a first distance sum is smaller than a first preset distance threshold in the at least one delivery unit, wherein the first distance sum of the delivery unit is the sum of shortest distances between the end task position of the delivery unit and the pickup position of each new order in the new order group; or
   determine, as the candidate delivery unit set, delivery units for which a second distance sum is smaller than a second preset distance threshold in the at least one delivery unit, wherein the second distance sum of the delivery unit is the sum of shortest distances between the end task position of the delivery unit and the delivery position of each new order in the new order group; or
   determine, as the candidate delivery unit set, delivery units for which a third distance sum is smaller than a third preset distance threshold in the at least one delivery unit, wherein the third distance sum of the delivery unit is the sum of a pickup distance sum and a delivery distance sum of the delivery unit, wherein the pickup distance sum of the delivery unit is the sum of shortest distances between the end task position of the delivery unit and the pickup position of each new orders in the new order group, the delivery distance sum of the delivery unit is the sum of shortest distances between the end task position of the delivery unit and the delivery position of each new orders in the new order group.

19. The electronic device according to claim 18, wherein the at least one processor is further caused to:
   in response to receiving a delivery area setting request including a delivery unit identifier and area information sent by a terminal, determine an area indicated by the area information to be a preset delivery area of a delivery unit indicated by the delivery unit identifier.

20. The electronic device according to claim 19, wherein the delivery unit further comprises a type of transportation means and a delivery range; and
   the at least one processor is further caused to:
      acquire a preset delivery excess distance corresponding to a type of transportation means of the delivery unit indicated by the delivery unit identifier; and
      determine, as a delivery range of the delivery unit indicated by the delivery unit identifier, an area with a shortest distance from an outer contour of the preset delivery area of the delivery unit indicated by the delivery unit identifier that is less than or equal to the determined preset delivery excess distance.

21. A non-transitory computer-readable storage medium, in which computer instructions are stored, wherein the computer instructions cause a processor to execute the following steps:
- acquiring a new order group, wherein the new order group comprises at least one new order;
- determining a candidate delivery unit set according to a preset delivery area and an end task position of each delivery unit of at least one delivery unit and order information concerning new orders in the new order group, wherein the end task position of the delivery unit is a position after the delivery unit has already completed the delivery concerning all allocated orders;
- selecting one delivery unit from the candidate delivery unit set as a target delivery unit on the basis of the order information concerning the new orders in the new order group and the preset delivery area and the end task position of each candidate delivery unit in the candidate delivery unit set; and
- allocating the new orders in the new order group to the target delivery unit.

* * * * *